United States Patent [19]

Strader

[11] Patent Number: 4,487,592
[45] Date of Patent: Dec. 11, 1984

[54] VIBRATION ISOLATOR COUPLING

[75] Inventor: Dennis L. Strader, Fishers, Ind.

[73] Assignee: Household Manufacturing Inc., Prospect Heights, Ill.

[21] Appl. No.: 502,130

[22] Filed: Jun. 8, 1983

[51] Int. Cl.$^3$ ............................ F16D 3/17; F16D 3/28
[52] U.S. Cl. ..................................... 464/88; 464/45; 464/95
[58] Field of Search ..................... 464/45, 51, 81, 85, 464/87, 88, 91–99, 153

[56] References Cited

U.S. PATENT DOCUMENTS

| | | | |
|---|---|---|---|
| 2,016,154 | 10/1935 | McWhirter | 464/96 |
| 2,514,051 | 7/1950 | Gredell | 464/45 |
| 2,561,830 | 7/1951 | Vanderzee | 464/45 |
| 2,844,948 | 7/1958 | Jarvis | 464/88 |
| 3,199,312 | 8/1965 | Glasgow | 464/88 |
| 3,440,899 | 4/1969 | McGavern et al. | 74/574 |

Primary Examiner—Stuart S. Levy
Assistant Examiner—Thomas R. Hannon
Attorney, Agent, or Firm—Thomas J. Greer, Jr.

[57] ABSTRACT

A torsional vibration isolator coupling displaying particular utility in automotive vehicles powered by internal combustion engines of the diesel or otto type. An input torque shaft having undesirable torsional vibrations, such as a torque directly derived from an internal combustion engine, is coupled to an input torque disc. The periphery of the input torque disc is coupled by an elastomer member and an intermediate rigid disc member to the periphery of a torque output disc, the periphery of the latter also carrying an elastomer member. The two torque discs are parallel and coaxial. A torque output shaft is carried by the torque output disc. A rigid cylindrical retainer axially clamps and axially compresses the elastomer members against their sandwiched torque discs. The output torque is substantially free of torsional vibrations, thus extending the life of power brake, power steering, and the like units driven by the torque output shaft.

6 Claims, 3 Drawing Figures

VIBRATION ISOLATOR COUPLING

This invention relates to a torsional vibration isolator coupling. An isolator coupling is employed to reduce the transmission of torsional vibration from a torque input shaft to a torque output shaft, so that the output shaft may be substantially free of torsional vibrations. Many so-called prime movers do not exhibit torsional vibrations, for example, a steam turbine transmits a torque which is substantially free of torsional vibrations. Other sources of torque such as an electric motor, are also substantially free of torsional vibrations. However, other prime movers inherently generate torsional vibrations. For example, an internal combustion engine, particularly of the piston type, transmits substantial torsional vibrations due to the inherent nature of such an engine. Namely, the ignition or combustion stroke of each cylinder causes a sudden application of torque to the output shaft, the output shaft being joined to the piston in the cylinder by the usual crank arm. While the smoothness of torque transmitted or generated by an internal combustion engine of this type may be increased by increasing the number of cylinders, there is a practical upper limit to the number of cylinders which may be employed. With the advent of smaller engine units for diesel and otto cycle internal combustion engines, the problem of torsional vibrations in an output shaft of such an engine becomes or may become severe.

In addition to transmitting torque from such an engine to the drive wheels of the vehicles powered by it, the torque output from the engine is employed to drive auxiliary devices such as alternators, power steering pumps, power brake units, and the like. While torsional vibrations in the output shaft of an engine can never be eliminated, the transmission of lessened torsional vibrations to devices driven by the engine will yield substantial improvement in the performance of such devices, such as power steering pumps, power brake units, and the like. A device which is interposed between the torque output of such an engine and a device driven by the engine to reduce torsional vibrations is known as a vibration isolator. The vibration isolator acts or functions in such a manner that the torsional vibrations are not transmitted beyond the isolator coupling, or if transmitted, are transmitted in substantially reduced amplitude. The expense of a vibration isolator is often recouped many times over in anticipated or expected longevity of auxiliary power devices driven from the output side or end of the isolator.

While superficially similar to a torsional vibration damper for internal combustion engines, a vibration isolator operates in a significantly different manner or mode. A torsional vibration damper converts energy in the form of mechanical torsional vibrations into energy in the form of heat. Assuming a single frequency of torsional vibrations in the engine (for purposes of this explanation) which single frequency is transmitted to the vehicle drive shaft, the damper would be tuned to that single frequency so as to set the usual damper inertia ring and associated elastomer into their natural resonant frequency. At such a frequency, the back and forth oscillation of the inertia ring is of maximum amplitude, thus distorting the elastomer a maximum amount, thus generating a maximum amount of heat in the elastomer due to internal friction therein. Hence, a damper of this type is tuned to resonate at one (in this example) frequency.

A torsional vibration isolator coupling which includes elastomer rings is not intended, at least primarily, to convert mechanical energy into heat energy. Ideally, a torsional vibration isolator would never operate at its natural resonant frequency. Instead, the intended range of operation of the isolator is beyond that engine speed corresponding to the natural resonant frequency of the vibration isolator.

The prior art is aware of somewhat similar resilient couplings. By way of example, U.S. Pat. No. 2,016,154 issued to McWhirter shows a plurality of driving discs 9 keyed to a torque input shaft 1. A plurality of driven discs 10 are each axially sandwiched between a plurality of radially extending elastomer disc elements 11. The peripheries of the driven discs 10 are keyed to a cylindrical torque output member 4, the latter coupled to a driving gear 2. While apparently operable for its intended use, the McWhirter coupling transmits torque from its input discs 9 to the torque output discs 10 through single elastomer bands or discs 11. In distinction to that arrangement, the construction of this invention employs at least two elastomer bands between its input and output torque discs and at least two additional elastomer bands or members to couple the input torque disc to the cylindrical member and the output torque disc to the cylindrical member. Such higher volume of elastomer permits lower unit elastomer strain. In many applications there are space constraints, this design permitting a higher rubber volume for a given isolator size. The present arrangement enables torque to be transmitted through the coupling in a plurality of paths from one due to the other.

In U.S. Pat. No. 2,561,830 issued to Vanderzee, a single torque disc 23 is sandwiched by a pair of elastomer discs 27, the elastomer and torque discs housed in a cylindrical member 15.

IN THE DRAWINGS

Figure 1:
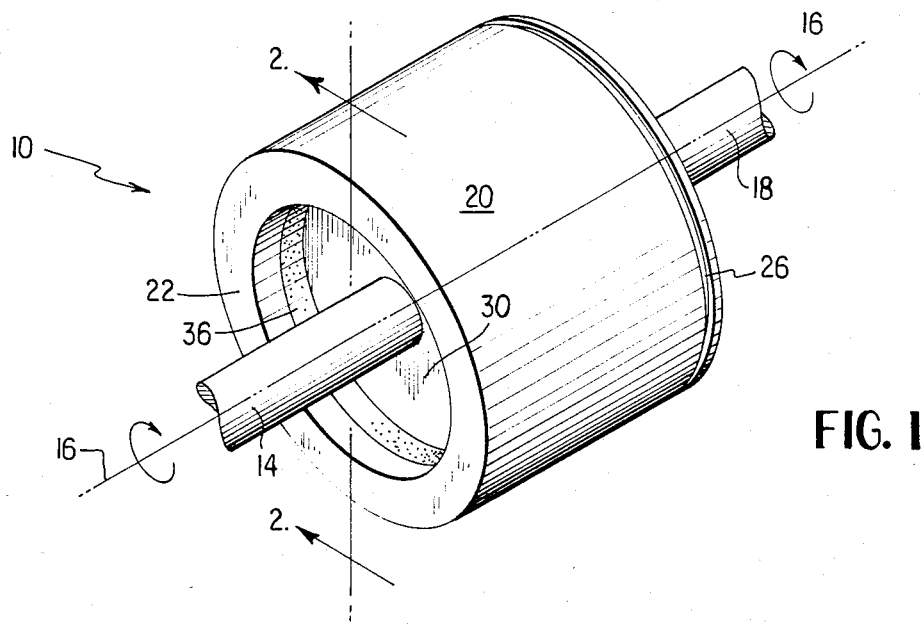
FIG. 1 is a perspective view showing the torsional vibration isolator of this invention.
Figure 2:
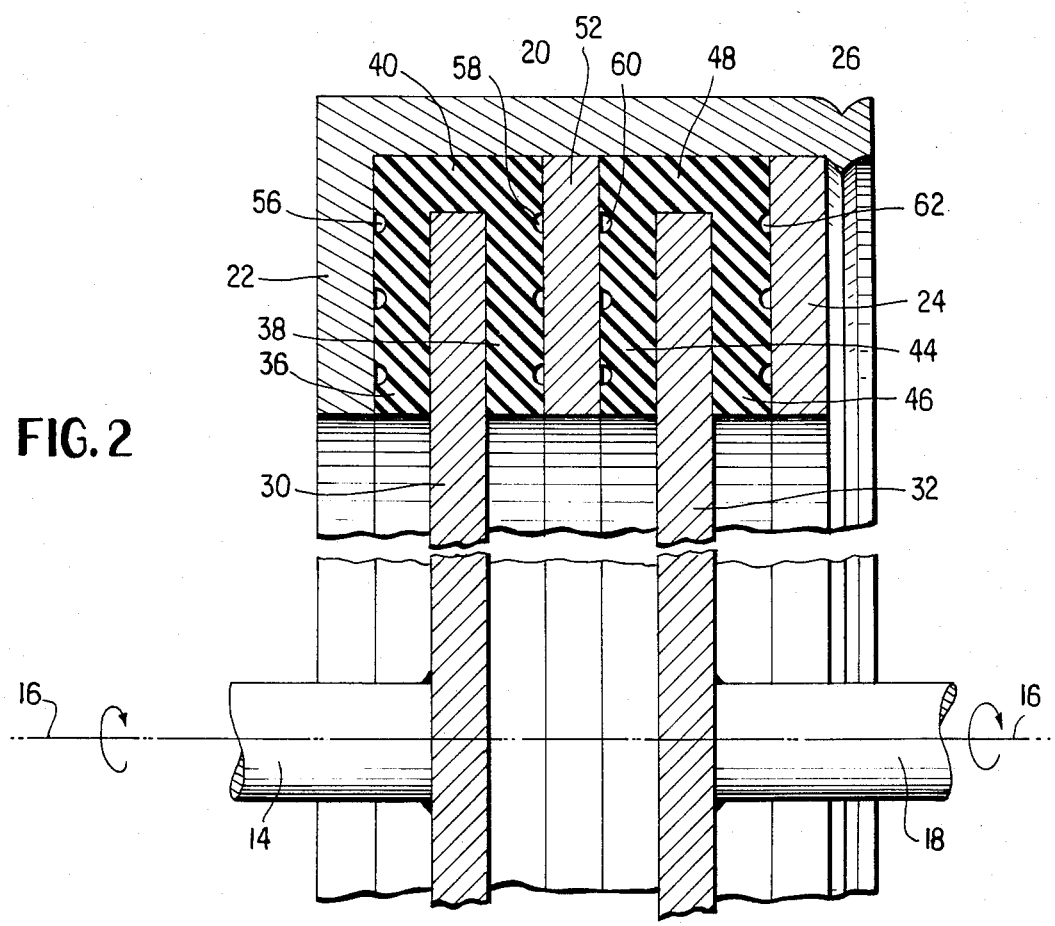
FIG. 2 is a view taken along section 2—2 of FIG. 1.

Referring now to the drawings, the number 10 denotes generally the vibration isolator of this invention. The numeral 14 denotes a torque input shaft, the shaft being directly coupled to a prime mover which inherently generates torsional vibrations in its output torque, such as an internal combustion engine. The numeral 16 denotes the axis of rotation of torque input shaft 14. The numeral 18 denotes an output shaft, also rotating about axis 16, and adapted to be coupled to an auxiliary power unit, such as a power brake unit, a power steering unit, an alternator, or the like of a vehicle powered by the engine coupled to shaft 14. The numeral 20 denotes a cylindrical member having at one end a radially inwardly extending flange 22. Both members 20 and 22 are annularly continuous. The numeral 24, illustrated at FIG. 2, illustrates a radially inwardly extending retained in the form of an apertured disc, similar in size and orientation to radially extending flange 22. Member 24 is also annularly continuous. The numeral 26 denotes a typical annular stake in the far right hand end (see FIG. 1) of cylinder 20, the stake holding apertured disc 24 against the elastomer elements now to be described. Other methods may be employed in lieu of staking, such as welding or bolting.

The numeral 30 denotes a torque input disc parallel to and coaxial with output torque disc 32. Disc 30 is coupled to input torque shaft 14, while disc 32 is coupled to output shaft 18. While illustrated at FIGS. 1 and 2 as being a welded coupling, the reader will understand that any one of a great variety of conventional couplings may be employed to couple shafts 14 and 18 to their respective discs 30 and 32. The numeral 36 denotes a radially extending elastomer disc on the left side (FIG. 2) of input disc 30, while the numeral 38 denotes a similar elastomer disc on the right side of torque disc 30. The numeral 40 denotes a generally axially extending connection between the radially outermost portions of elastomer members 36 and 38. As shown at FIG. 2, a generally U-shaped element 36, 38, 40 is defined in longitudinal axial cross-section of the isolator coupling. The numerals 44 and 46 denote discs of elastomer similar to 36 and 38, with elastomer members 44 and 46 being integrally joined at their outermost portions by an integral portion 48. Elastomer element 44, 46, 48 is also U-shaped in longitudinal axial cross-section. The numeral 52 denotes an apertured disc, similar in form to disc 24 and interposed between elastomer members 38 and 44. The numeral 56 denotes any one of a plurality of pockets or recesses on the face of elastomer member 36 which contacts axially innermost surface of element 22. Similarly, numerals 58, 60 and 62 denote similar recesses or pockets on the indicated elastomer to interfaces.

In practice, bight portions 40 and 48 may be formed thicker than radially oriented portions 36, 38, 44 and 46 in order to make the stress distribution in the elastomer more uniform. In this art, a taper form for analogous elastomer members has been employed to make stress distribution more uniform. However, such designs do not account for the centrifugal loading of the elastomer and can be more difficult to manufacture.

Elements 20, 22, 24, 30, 32 and 52 are preferably of a rigid material such as iron or steel. Disc 52 may be rigidly attached at its radially outermost portion to retainer 20. However, such a construction would increase the cost of assembling the isolator coupling.

As shown in U.S. Pat. No. 3,440,899 issued to McGavern and assigned to the assignee of this application, recesses 56, 58, 60 and 62 are filled with a silicone damping liquid of a type described in the McGavern patent. As indicated at FIG. 1, the elements shown in FIG. 2 are annularly continuous. Radially extending elastomer portions 36, 38, 44 and 46 are axially compressed, being squeezed in the axial direction by radially extending flange elements 22 and 24.

In operation, input torque transmitted by shaft 14 is transmitted by disc 30 through the first U-shaped elastomer members 36, 40, 38 to members 20, 22, 24 and 52. The torque then passes through elastomer members 44, 46 and 48 (three paths) to output disc 32 and thence to output shaft 18.

By virtue of the elastomer members, the torsional vibrations in input shaft 14 are only imperfectly transmitted, i.e., transmitted with significant attenuation, to output shaft 18. In the case of a piston internal combustion engine of the diesel or otto type which turns shaft 14 at a rate of 3,000 rpm, the torsional angular vibration superposed upon this uni-directional torque may exhibit an amplitude from ¼° to 1° at a frequency of between 150 and 250 cycles per second. This amplitude and frequency is substantially untransmitted by the vibration isolator of this invention, and accordingly output shaft 18 is substantially free of them. The presence of axially intermediate disc 52 permits yet another metal to rubber interface or bond surface. The elastomer to metal interfaces are preferably bonded together, as by techniques known in this art.

The elastomer bands or discs 36, 38, 44 and 46 may be of uniform thickness or may be varied in thickness. In practice, the thickness of bight portions 40 and 48 may be greater than the thickness of the remaining elastomer portions to thereby make more uniform the stress distribution over the entire volume of each U member. The connecting or bight portions 40 and 48 may be omitted, to thereby admit of the use of elastomer bands of different types of elastomer in any installations where one side of the coupling would operate in an atmosphere different from the other side or end.

By way of example, the elastomer bands or discs 36, 38, 44 and 46 may be first applied to the periphery of their respective torque discs 30 and 32 by bonding prior to clamping by the cylinder 20, 22 and retainer 24. If the elastomer bands are provided with bight portions 40 and 48, half of each bight portion may be bonded, with an additional step of joining the half-bights prior to assembly.

The coupling from torque output shaft 18 to auxiliary power devices such as an alternator, power brake pump and the like is usually effected by a belt and pulley arrangement.

Figure 3:
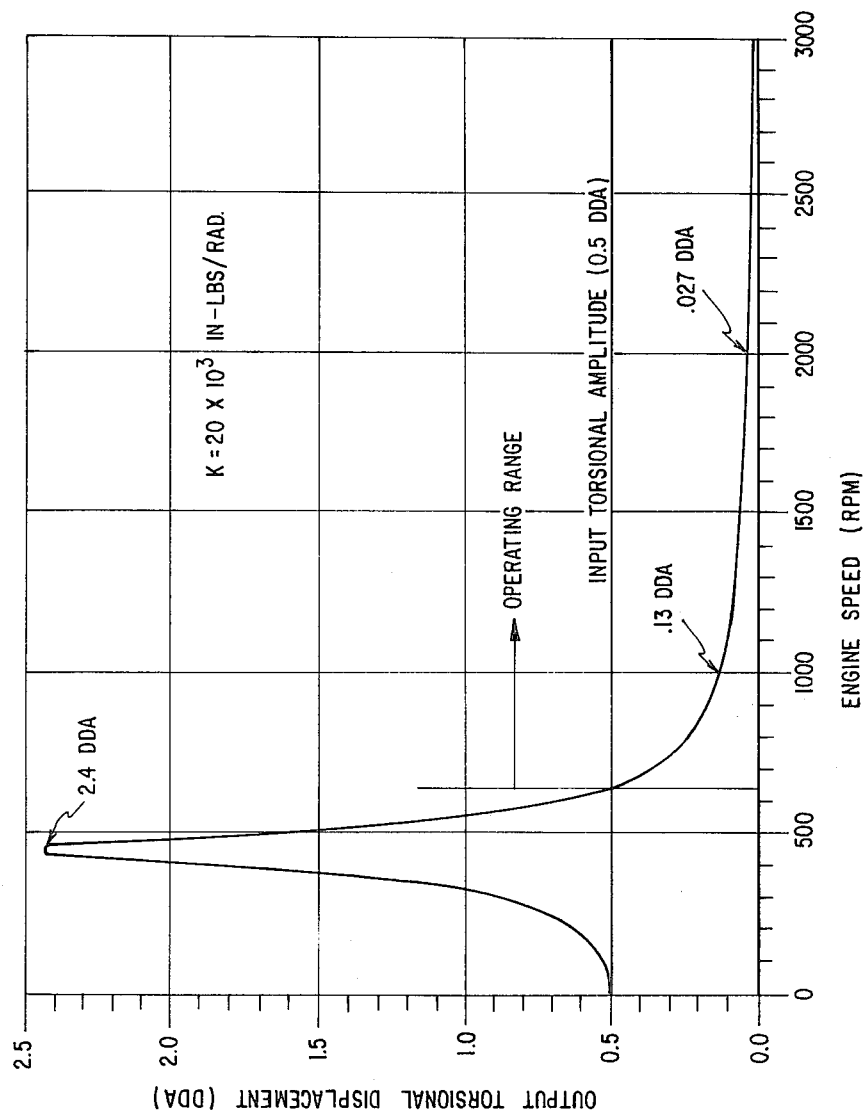
FIG. 3 is a plot illustrating the operation of a typical torsional vibration isolator.

Referring now to FIG. 3 of the drawings, the curve illustrates the degrees double amplitude (DDA) of the torsional vibrations in the output shaft of a typical torsional vibration isolator, such as shaft 18 of the isolator of FIG. 1. The plot is for an elastomer of a specific damping coefficient and for a stiffness K of $20 \times 10^3$ inch-pounds/radian. The input DDA is 0.5, being constant. It is seen that a natural resonance peak occurs at about 450 rpm engine speed, and is of an amplitude of about 2.4 DDA. As engine speed increases, the value of the output DDA increases. At about 650 rpm engine speed, the input and the output DDA are the same. Beyond this value, the output DDA drops significantly, being about 0.13 at an engine speed of about 1,000 rpm and about 0.027 DDA at an engine speed of about 2,000 rpm. The intended range of operation of the torsional vibration isolator depicted in FIG. 3 is from about 650 rpm and upwards. Thus at an engine speed of 1,000 rpm, the output amplitude is only 0.26 of that of the input DDA amplitude. At 2,000 rpm, the output amplitude is only about 0.054 of that of the input DDA.

It is claimed:

1. A torsional vibration isolator coupling for obtaining a substantially torsional vibration free output torque from an input torque having torsional vibrations, such as an input torque derived directly from an internal combustion engine, the coupling including, an input torque disc formed of rigid material and adapted to be coupled to an input torque shaft, an output torque disc formed of rigid material and adapted to be coupled to an output torque shaft, the two discs being parallel and coaxial with each other, an annular elastomer band on the two faces of each disc, each elastomer band being contiguous to the periphery of its respective torque disc and extending radially inwardly from said periphery, to thereby define four axially spaced elastomer bands, a first pair of which sandwiches a radially outermost portion of the input torque disc and a second pair of which sandwiches a radially outermost portion of the output torque disc, a rigid elastomer band separator disc axially intermediate the two torque discs and axially positioned between the two axially innermost elastomer bands, the rigid band separator disc being of substantially the same radial extent as the two elastomer discs which axially sandwich it, a rigid annular retainer, the annular retainer being in the form of a cylinder having rigid, radially extending flanges at its ends, said flanges contacting and abutting the two axially outermost elastomer bands to thereby axially clamp and axially compress the elastomer bands against the two torque discs, whereby at least four radially extending, elastomer to rigid member interfaces are defined.

2. The isolator coupling of claim 1 wherein the radial extent of said retainer flanges is substantially the same as the radial extent of the elastomer bands which they contact.

3. The isolator coupling of claim 1 wherein the radially outermost portions of the two elastomer bands of each said pair of elastomer bands are integrally joined, whereby each of said pairs of elastomer bands is generally U-shaped in longitudinal, axial cross-section, the bight of each U extending axially.

4. The isolator coupling of claim 1 wherein the elastomer surface of at least one of the elastomer to rigid member interfaces is provided with a plurality of recesses, the recesses containing a damping liquid.

5. The isolator coupling of claim 1 wherein the elastomer bands are of elastomers of different chemical compositions and elastic properties.

6. The isolator coupling of claim 3 wherein the thickness of each axially extending, bight portion of the U-shaped elastomer members is greater than the thickness of its associated radially extending elastomer bands, to thereby make more uniform the stress distribution in each U member.

* * * * *